(12) United States Patent
Challener et al.

(10) Patent No.: US 8,433,924 B2
(45) Date of Patent: Apr. 30, 2013

(54) APPARATUS, SYSTEM, AND METHOD FOR AUTHENTICATION OF A CORE ROOT OF TRUST MEASUREMENT CHAIN

(75) Inventors: David Carroll Challener, Raleigh, NC (US); Howard Locker, Cary, NC (US); Randall Scott Springfield, Chapel Hill, NC (US); Rod D. Waltermann, Rougemont, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 1261 days.

(21) Appl. No.: 11/612,367

(22) Filed: Dec. 18, 2006

(65) Prior Publication Data

US 2008/0148064 A1 Jun. 19, 2008

(51) Int. Cl.
*G06F 21/00* (2006.01)

(52) U.S. Cl.
USPC ............ 713/189; 713/188; 723/22; 723/23; 723/24; 723/26

(58) Field of Classification Search ............... 713/188, 713/189; 726/22–24, 26
See application file for complete search history.

(56) References Cited

U.S. PATENT DOCUMENTS

| 7,318,150 B2 * | 1/2008 | Zimmer et al. | 713/2 |
| 7,506,380 B2 * | 3/2009 | Hunter et al. | 726/26 |
| 7,770,002 B2 * | 8/2010 | Weber | 713/159 |
| 2005/0246521 A1 * | 11/2005 | Bade et al. | 713/150 |
| 2005/0257073 A1 * | 11/2005 | Bade et al. | 713/193 |
| 2008/0148046 A1 * | 6/2008 | Glancey | 713/156 |

OTHER PUBLICATIONS

U.S. Appl. No. 60/869,026—"Real-Time Checking of Online Digital Certificates", Glancey, Dec. 7, 2006.*

* cited by examiner

*Primary Examiner* — Jeffrey Pwu
*Assistant Examiner* — Helai Salehi
(74) *Attorney, Agent, or Firm* — Kunzler Law Group, PC (57) ABSTRACT

An apparatus, system, and method are disclosed for authentication of a core root of trust measurement chain. The apparatus for authentication of a CRTM chain is provided with a plurality of modules configured to carry out the steps of retrieving a decryption key from a predetermined location on the device selected for authentication, decrypting an authentication signal using the decryption key, and communicating the decrypted authentication signal to a user. In the described embodiments, these modules include a retrieval module, a decryption module, and a communication module. Beneficially, such an apparatus, system, and method would reliably verify that a link in the CRTM chain has not been corrupted, modified, or infected with a computer virus. Specifically, such an apparatus, system, and method would enable verification that the hypervisor has not been corrupted, modified, or infected with a computer virus.

20 Claims, 7 Drawing Sheets

APPARATUS, SYSTEM, AND METHOD FOR AUTHENTICATION OF A CORE ROOT OF TRUST MEASUREMENT CHAIN

BACKGROUND OF THE INVENTION

1. Field of the Invention

This invention relates to security in a computing environment and more particularly relates to authentication of a core root of trust measurement chain.

2. Description of the Related Art

Communication of information is often accomplished over computer networks using common computing devices such as servers, workstations, laptops, PDAs, and the like. Since much of the information communicated over such networks is sensitive or private, information security is a primary concern of Information Technology (IT) professionals and users. Information security threats may include data corruption and theft. The security of a computing device or network may be compromised if any component of the device or network is infected with a computer virus or other versions of malware.

A computer virus is typically a small executable application that is transmitted through a network by computer hacking or social engineering. For example, a hacker may intentionally infiltrate a particular device by scanning open networking ports on the device for vulnerabilities. If vulnerability is found, the hacker may upload a virus executable to the device which maintains a covert communication link with the hacker. Typical viruses include Trojans, Worms, and the like. Alternatively, through fraud, deceit, enticement, or other means, a user of the device or network may inadvertently infect the device by clicking on an attachment to an email message. This is typically referred to as social engineering.

A typical virus runs like an application within a particular operating system. For example, a Trojan may execute and run like a Windows® application or executable on a Windows® operating system. However, such viruses are generally not a significant threat, because common virus scan software can generally detect and remove such viruses. Other viruses or malware may run more covertly. For example, some viruses may embed code within other executable programs such as web browsers. When the application is run by the user, the virus may execute as a hidden function of the application. Common virus scan software may also detect this type of virus. Typically, if a virus is running in the application layer on top of an operating system, it is generally more easily detected and repaired.

However, some viruses may embed below the operating system level within the boot operations of the device. Typical computing devices include several layers of boot operations prior to loading and executing the operating system and applications. For example, common Intel® and AMD® bases systems load execute a virtualization code prior to loading the operating system. A virtualization code is typically referred to as a hypervisor or a Virtual Machine Monitor (VMM). The hypervisor may present virtual hardware configurations to multiple operating systems simultaneously. In such systems, multiple operating systems may be running on a single hardware platform simultaneously. If a virus infects the hypervisor and runs beneath any of the operating systems, the virus may be extremely difficult to detect and repair.

In order to secure these lower level boot processes, the code for the boot processes are often encrypted. Some common systems include a Trusted Platform Module (TPM) for decrypting such files in response to a determination that the files are from a trusted source. For example, the TPM may decrypt the hypervisor code in response to a determination that the hypervisor code as a valid digital signature from the manufacturer. However, such systems may not guarantee that the underlying code has not been modified, corrupted, or infected with a virus.

The verification process typically starts with verification of a boot block which is commonly stored in Read Only Memory (ROM). The boot block is generally immutable. The boot block is verified by the TPM, decrypted, and then executed by the CPU. Verification of the boot block by the TPM is commonly referred to as Root of Trust Measurement (RTM) and the boot block is commonly referred to as the Core Root of Trust (CRT), verification of the entire chain is referred to as Core Root of Trust Measurement (CRTM). The boot block program may then select the next process in a chain of process to be executed during system boot operations. Each process is verified by the TPM, and a value corresponding to the verification is stored in a Platform Configuration Register (PCR). The verification and storage of the value in the PCR is typically referred to as measurement. Thus, a CRTM chain is developed, where each link has been independently verified, measured, and determined to be trustworthy. Nonetheless, such methods do not always completely ensure that one of the processes has not been modified, corrupted, or infected.

SUMMARY OF THE INVENTION

From the foregoing discussion, it should be apparent that a need exists for an apparatus, system, and method that authenticate a CRTM chain. Beneficially, such an apparatus, system, and method would reliably verify that a link in the CRTM chain has not been corrupted, modified, or infected with a computer virus. Specifically, such an apparatus, system, and method would enable verification that the hypervisor has not been corrupted, modified, or infected with a computer virus.

The present invention has been developed in response to the present state of the art, and in particular, in response to the problems and needs in the art that have not yet been fully solved by currently available trusted configuration devices. Accordingly, the present invention has been developed to provide an apparatus, system, and method for authentication of a CRTM chain that overcome many or all of the above-discussed shortcomings in the art.

The apparatus for authentication of a CRTM chain is provided with a plurality of modules configured to carry out the steps of retrieving a value from a predetermined location on a device selected for authentication for unlocking a decryption key, decrypting an authentication signal using the decryption key, and communicating the decrypted authentication signal to a user. In the described embodiments, these modules include a retrieval module, a decryption module, and a communication module.

In one embodiment, the retrieval module further comprises a TPM interface configured to determine an operation state of the TPM, and wherein the decryption module decrypts the authentication signal in response to a determination that the TPM is operating in a predetermined operation state. In a further embodiment, the retrieval module includes a PCR interface configured to obtain a value from the PCR, wherein the value was previously extended to the PCR by a computer program selected for authentication, and wherein the value unlocks the decryption key. In on embodiment, the program selected for authentication is a virtualization program.

In a further embodiment of the apparatus, the decryption module includes a comparison module configured to compare the value obtained by the PCR interface with a trusted value stored separately from the device selected for authentication, and wherein the decryption module decrypts the authentication signal in response to a determination that the value obtained by the PCR interface and the trusted value match. The decryption module may also include a virus scan module configured to perform a virus scan on the selected device, and wherein the decryption module decrypts the authentication signal in response to a determination that the device selected for authentication is virus free. Another common solution is to compare the configuration of system with the configuration of a trusted system. However, such comparisons may be time consuming and inconvenient.

Additionally, the communication module may include an audio module configured to play an audio-based authentication signal to a user. The communication module may also include a video module configured to display a video-based authentication signal to a user. In further embodiment the communication module may include a Light Emitting Diode (LED) module configured to display an LED-based authentication signal to a user.

A system of the present invention is also presented for authentication of a CRTM chain. In one embodiment, the system includes a device selected for authentication. The device selected for authentication may include a TPM configured to facilitate CRTM, and a PCR coupled to the TPM, and configured to store CRTM values. Additionally, the system may include a removable authenticator. The removable authenticator may be configured to retrieve a value from a predetermined location on a device selected for authentication for unlocking a decryption key, decrypt an authentication signal using the decryption key, and communicate the decrypted authentication signal to a user.

A method of the present invention is also presented for authentication of a CRTM chain. The method in the disclosed embodiments substantially includes the steps necessary to carry out the functions presented above with respect to the operation of the described apparatus and system. In one embodiment, the method includes retrieving a value from a predetermined location on a device selected for authentication for unlocking a decryption key, decrypting an authentication signal using the decryption key, and communicating the decrypted authentication signal to a user.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
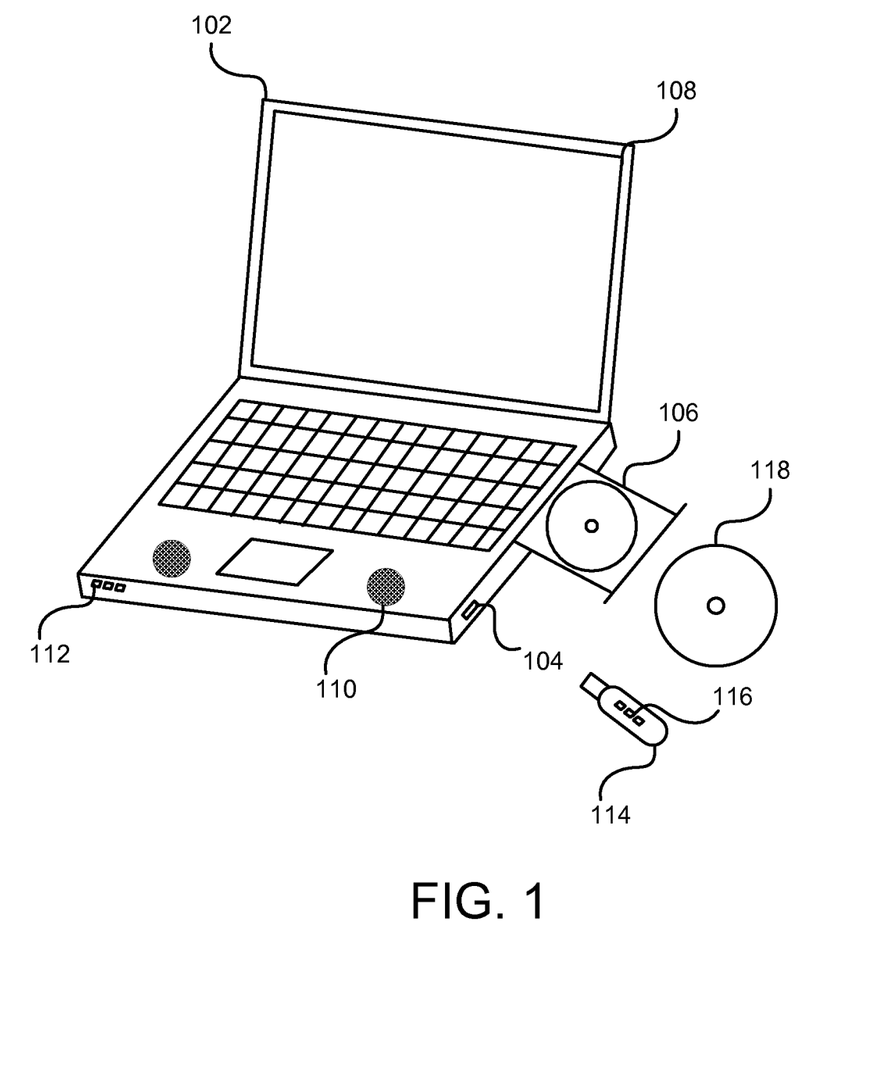
FIG. 1 is a perspective view of one embodiment of a system for authentication of a CRTM chain.

FIG. 1 is illustrates one embodiment of a system 100 for authentication of a CRTM chain. In one embodiment, the system 100 includes a device 102 selected for authentication. Additionally, the system may include a removable authenticator 114, 118. The removable authenticator 114, 118 may retrieve a decryption key from a predetermined location on the device 112, decrypt an authentication signal using the decryption key, and communicate the decrypted authentication signal to a user. In various embodiments, the authentication signal may include a unique ring tone or other audio sound, a picture, phrase, or other video signal, or an LED signal or sequence of signals. For example, the authenticator 114, 118 may retrieve a decryption key from a predetermined location on the device 102, and use the key to decrypt a ring tone. If the key is correct, authenticator 114, 118 may decrypt the ring tone accurately. The user may be able to verify that the device 102 and the CRTM chain running on the device 102 are authentic if the ring tone played back is correct.

In one embodiment, the device 102 selected for authentication is a laptop computer. Alternatively, the device 102 may include a desktop workstation, a server, a PDA, or any other electronic or computing device. The device 102 may include one or more interface ports 104. For example, a laptop 102 may include one or more Universal Serial Bus (USB) ports. Alternatively, the interface port 104 may include a serial port, Infrared (IR) port, or the like. In one embodiment, the interface ports 104 facilitate interaction with the removable authenticator 114. In a further embodiment, the device 102 may include a Compact Disk (CD) ROM drive 106, a DVD drive, a floppy drive, or the like. In such an embodiment, the drive 106 may facilitate interaction with removable authenticator 118.

The device 102 may include a video display 108 to facilitate the authenticator 114, 118 with displaying video-based authentication signals. In another embodiment, the device 102 may include speakers 110 or other audio devices configured to facilitate the authenticator 114, 118 with playing audio-based authentication signals. In a further embodiment, the device 102 may include one or more LEDs 112 for facilitating the authenticator 114, 118 with displaying LED-based authentication signals. Further embodiments of the device 102 selected for authentication are discussed below with reference to FIG. 2.

In one embodiment, the removable authenticator 114 is a stand-alone apparatus. The removable authenticator may include a connector or other interface for interfacing the interface port 104 of the device 102. In such an embodiment, the removable authenticator may include an independent means for communicating the authentication signal. For example, the stand-along authenticator 114 may include one or more LEDs 116 for displaying an LED based authentication signal to a user.

In an alternative embodiment, the removable authenticator 118 includes a removable storage medium such as a CD, DVD, flash memory, or the like. In such an embodiment, the removable authenticator 118 may contain computer readable code configured to carry out the operations of the removable authenticator 118. In such an embodiment, the removable authenticator 118 may require the use of the processor and other components of the device 102 to facilitate carrying out authentication. For example, the removable authenticator may include operations for interfacing with the audio, video, and LED display controls of the device 102. In such an embodiment, the authentication signal may be communicated by the removable authenticator 118 to the user via the audio, video, or LED display controls of the device 102. In the interests of clarity, this specification will refer only to this embodiment of the removable authenticator 118 from this point forward. This convention is only intended for simplification of the description and is not intended to limit the scope of the removable authenticator 114, 118.

Figure 2:
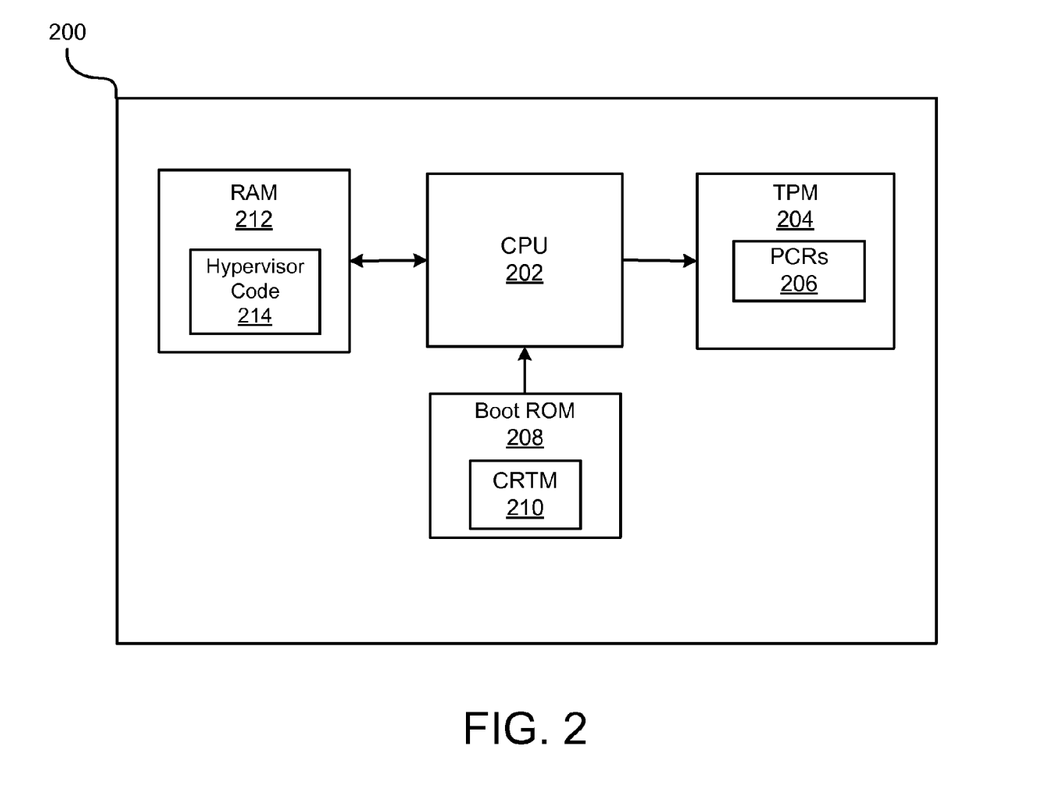
FIG. 2 is a schematic block diagram of one embodiment of a device selected for authentication in a system for authentication of a CRTM chain.

FIG. 2 is a schematic block diagram of one embodiment of a device 200 selected for authentication in a system 100 for authentication of a CRTM chain. In one embodiment, the device 200 includes a Central Processing Unit (CPU) 202. Additionally, the device 200 may include a TPM 204. Additionally, the device 200 may include boot ROM 208, and RAM 212. In various additional embodiments, the device 200 may include Input/Output (I/O) ports 104, a storage media reader 106, a video display 108, speakers 110, and LEDs 112.

In one embodiment, the CPU 202 may access the boot ROM 208 and the RAM 212 to load and execute programs, processes, and applications. Additionally, the CPU 202 may access the TPM 204 to verify the authenticity of code loaded by the CPU 202. In one embodiment, the CPU 202 may include an Intel® brand processor. In an alternative embodiment, the CPU 202 may be an AMD® or other brand of processor. In a specific embodiment given by way of example only, the CPU 202 may include an Intel® brand processor configured with Virtualization Technology (VT) or LaGrande Technology (LT).

The TPM 204 may operate in multiple operation states. In one embodiment, these operation states are called localities. Each locality may enable the TPM 204 or the CPU 202 to perform different functions and operations. The TPM 204 may have one or more pins, pads, or other electrical connectors in electronic communication with the CPU 202. The CPU 202 may interact with the TPM 204 by sending signals to the pins, pads, or connectors. For example, in one embodiment, the CPU 202 may trigger the TPM 204 to operate in locality three (3). In another embodiment, the CPU 202 may trigger the TPM 204 to operate in locality two (2). In various embodiments, the CPU 202 may extend root of trust measurement information to the TPM 204.

In a further embodiment, the CPU 202 may execute operations for the removable authenticator 118. For example, if the removable authenticator 118 includes a removable storage medium, the CPU 202 may load and execute code from the removable authenticator 118 and facilitate carrying out the operations of retrieval, decryption, and communication. Further embodiments of the removable authenticator 118 are discussed below with reference to FIGS. 3 and 4.

A TPM 204 can be used to ensure that each device 102 reports its configuration parameters in a trustworthy manner. Platform boot processes are augmented to allow the TPM 204 to measure each of the components in the system (both hardware and software) and securely store the results of the measurements in PCRs 206 within the TPM 204. IT personnel can use these measurements to determine which devices 102 are vulnerable to virus attacks.

The TPM 204 may include one or more PCRs 206 for holding measurement information. For example, the CPU 202 may create a hash value corresponding to the hypervisor code using a hash function. The CPU 202 may then communicate the hash value to the TPM 204 for verification and measurement. The TPM 204 may extend the hash value into a predetermined PCR 206 for storage. In one embodiment, extending the hash value to the PCR 206 is referred to as measurement.

In one exemplary embodiment of a boot up operation of the device 200, the CPU 202 may access the boot ROM 208 in response to being powered on. In such an example, the CPU 202 may access the boot block or CRTM 210 from the boot ROM 208. The boot block 210 may then be verified and measured by the TPM 204, and the measurement value may be stored in the PCR 206. If the boot block is authentic, it may be decrypted and executed by the CPU 202. The boot block process may then access the RAM 212 and repeat the procedure of verification, measurement, decryption, and execution for the subsequent link in the CRTM chain. Each process may select additional processes for verification, measurement, decryption, and execution. For example, a trusted process may access the RAM 212 and retrieve the hypervisor code 214. The hypervisor code 214 may be verified and measured by the TPM 204. The measurement may be stored in the PCR 206, and the CPU 202 may execute the hypervisor, which creates a virtual platform for an operating system.

Figure 3:
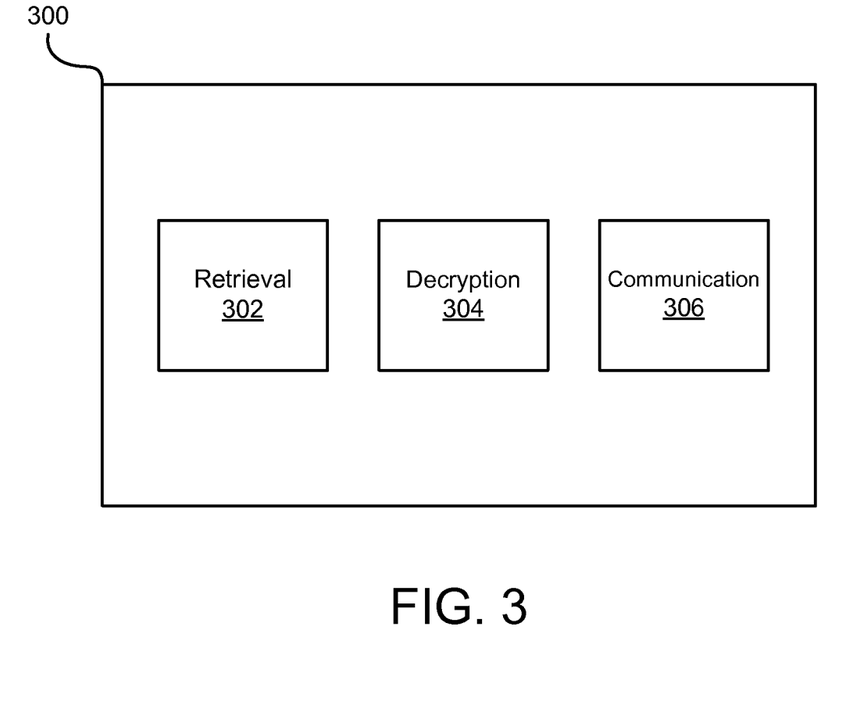
FIG. 3 is a schematic block diagram of one embodiment of an apparatus for authentication of a CRTM chain.

FIG. 3 is a schematic block diagram of one embodiment of an apparatus 300 for authentication of a CRTM chain. In one embodiment, the apparatus 300 includes the removable authenticator 118. The apparatus 300 may include a retrieval module 302 configured to retrieve a value from a predetermined location on a device selected for authentication for unlocking a decryption key. In one embodiment, the predetermined location may be a pre-selected PCR 206 on the TPM 204. Additionally, the apparatus 300 may include a decryption module configured to decrypt an authentication signal using the decryption key. In a further embodiment, the apparatus 300 includes a communication module 306 for communicating the decrypted authentication signal to a user.

In one embodiment, the retrieval module 302 may interface with the PCR 206 on the TPM 204 to retrieve the measurement value of a selected software or hardware component to be authenticated. In a particular embodiment, the measurement value is a hash value obtained from the base code of an application selected for authentication. For example, the PCR 206 may contain a hash value corresponding to the hypervisor code 214. The hash value may be derived directly from the code. In one embodiment, the hash value is a one hundred and sixty (160) bit binary number derived from a combination of the hypervisor code 214 and a predetermined hash function. Therefore, if the hypervisor code 214 has been modified, corrupted, or infected, the hash value may change. In such an embodiment, the hash value stored in the PCR 206 may be required to unlock a decryption key to be used to decrypt the authentication signal.

The decryption module 304 may decrypt an authentication signal in response to a determination that the value obtained by the retrieval module 302 is valid. In one embodiment, the authentication signal is a ring tone, video display, or LED display. In a further embodiment, the decryption key is included in a secure cryptographic blob. The cryptographic blob may include the decryption key and trusted has values. If the has value obtained from the PCR 206 matches the trusted hash values, the decryption module 304 may unlock the cryptographic blob and release the decryption key. The decryption module 304 may then decrypt the authentication signal using the unlocked decryption key. For example, an audio-based authentication signal may include a pre-selected and encrypted ring tone. The ring tone may be encrypted using the key that is included in a cryptographic block with a hash value of an authentic hypervisor code 214.

If the hypervisor code 214 has been corrupted, modified, or infected, the hash value stored in the PCR 206 will not be the same as the value of the trusted hash value of the known hypervisor code 214. The decryption module 304 may only be able to unlock the decryption key and decrypt the ring tone if the hash value extended to the PCR 206 matches the trusted hash value in the cryptographic blob. Therefore, the decryption module 304 may only be able to accurately decrypt the ring tone if the hash value of the hypervisor code 214 retrieved from the PCR 206 matches the hash value of the original authentic hypervisor code 214. The decryption module 304 may use symmetric decryption, public/private decryption, or any other form of predetermined decryption technique suitable for decrypting the authentication signal. In a further embodiment, the decryption module 304 may utilize the TPM 204 to decrypt the authentication signal.

The communication module 306 may communicate the decrypted authentication signal to a user. In one embodiment, the communication module may communicate an inaccurate representation of the authentication signal because the authentication signal was not accurately decrypted. In such an embodiment, the inaccurate representation of the authentication signal may indicate to the user that the device 102 has a corrupt, modified, or infected component. In an alternative embodiment, the communication module 306 may communicate a warning signal indicating that the device 102 is not authentic in some way. The communication module 306 may use stand-alone communication components. Alternatively, the communication module 306 may utilize the user I/O components of the device 102 selected for authentication to communicate the authentication signal.

Figure 4:
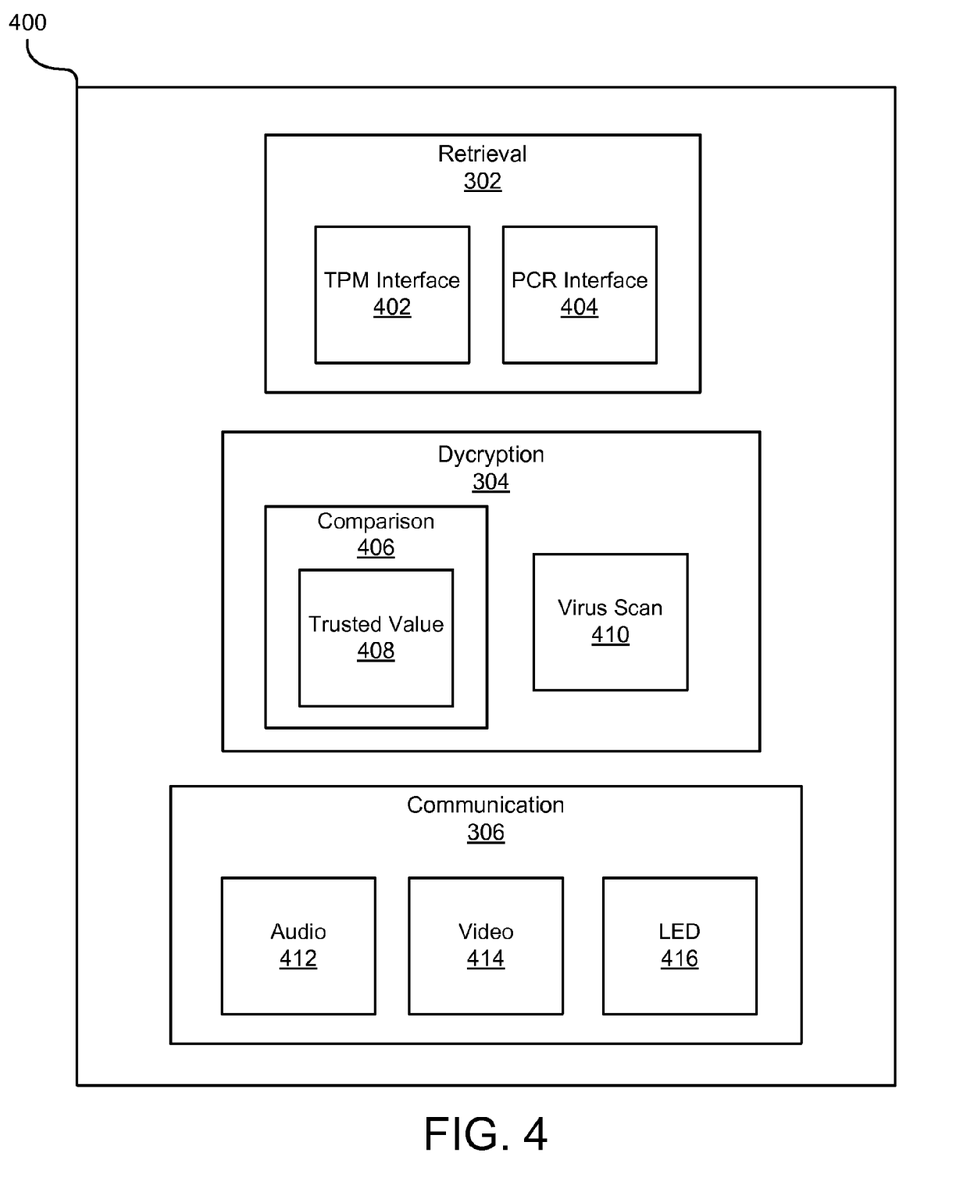
FIG. 4 is a detailed schematic block diagram of one embodiment of an apparatus for authentication of a CRTM chain.

FIG. 4 is a detailed schematic block diagram of one embodiment of an apparatus 400 for authentication of a CRTM chain. In one embodiment, the apparatus 400 comprises the removable authenticator 118. In the depicted embodiment, the apparatus 400 includes the retrieval module 302, decryption module 304, and communication module 306 as discussed above with reference to FIG. 3. In a further embodiment, the retrieval module 302 may additionally include a TPM interface 402 and a PCR interface 404. The decryption module 304 may additionally include a comparison module 406 and a virus scan module 410. In a further embodiment, the communication module 306 may include an audio module 412, a video module 414, and/or an LED module 416.

The TPM interface 402 may determine an operation state of the TPM 204. In one embodiment, the decryption module 304 decrypts the authentication signal in response to a determination that the TPM 204 is operating in a predetermined operation state. For example, the TPM interface 402 may determine that the TPM 204 is operating in locality two (2). In one embodiment, the decryption module 304 may only decrypt the authentication signal if the TPM 204 is operating in a predetermined state or locality. For example, the decryption module 304 may decrypt a ring tone if the TPM interface 402 determines that the TPM 204 is operating in locality two (2). In one embodiment, the TPM interface 402 may access the TPM 204 via preexisting connections with the CPU 202.

The retrieval module 302 may further include a PCR interface 404 configured to obtain a value from the PCR 206, wherein the value was previously extended to the PCR 206 by a computer program selected for authentication. In one embodiment, the value retrieved by the PCR interface 404 is a hash value of a program selected for authentication which is used by the decryption module 304 to unlock the decryption key used to decrypt the authentication signal. A method 500 for extending this value to the PCR 206 is discussed in greater detail below, with reference to FIG. 5. In one embodiment, the PCR interface 206 utilizes existing hardware connections between the CPU 202, TPM 204 and the PCR 206. For example, the PCR interface 404 may issue a predetermined command via the CPU 202 to the TPM 204 requesting access to the value in the PCR 206. For instance, the PCR interface 404 may retrieve a hash value of the hypervisor code 214 from the PCR 206.

In a further embodiment, the decryption module 304 may additionally include a comparison module 406. The comparison module 406 may compare the value obtained by the PCR interface 404 with a trusted value 408 stored separately from the device 102 selected for authentication. The decryption module 304 may decrypt the authentication signal using a decryption key unlocked by the value obtained by the PCR interface 404 in response to a determination that the value obtained by the PCR interface 404 and the trusted value 408 match. For example, a one hundred and sixty (160) bit hash value of a trusted hypervisor code 214 may be stored in the comparison module 406.

The comparison module 406 may then compare a hash value of the hypervisor code 214 that was extended into the PCR 206 at the time the hypervisor was loaded with the trusted has value 408. If the hash values are different, the decryption module 304 may not decrypt the authentication signal, indicating to the user that the hypervisor has been corrupted, modified, or infected with a virus. In one embodiment, the comparison module 406 may store the trusted value 408 on a read only storage medium. In a further embodiment, the trusted value 408 may be stored separately from the device 102. The comparison module 406 may compare the value obtained by the retrieval module 302 and the trusted value 408 using XOR logic or an XOR function executed on the CPU 202.

The decryption module 304 may additionally include a virus scan module 410. The virus scan module 410 may perform a virus scan on the selected device 102. In one embodiment, the decryption module 410 may decrypt the authentication signal in response to a determination that the device 102 selected for authentication is virus free. Alternatively, the decryption module 304 may not decrypt the authentication signal in response to a determination that the device 102 has been infected with a virus or other malware. In one embodiment, the CPU 202 may facilitate operation of the virus scan module 410.

In one embodiment, the communication module 306 may include an audio module 412 configured to play an audio-based authentication signal to a user. For example, the audio module 412 may include a speaker 110 or the like. In another embodiment, the audio module 412 may include a piezoelectric sound emitting device. The audio module 412 may play audio-based authentication signals such as music, ring tones, alarms, and the like.

The communication module 306 may also include a video module 414 configured to display a video-based authentication signal to a user. For example, the video module 414 may play a video signal, display a picture, and display a phrase, flash, or the like. The video module 414 may include a Liquid Crystal Display (LCD) screen or the like. In a further embodiment, the video module 414 may include drivers or software connections to the video display of the device 102 selected for authentication.

In a further embodiment, the communication module 306 may include an LED module 416 configured to display an LED-based authentication signal to a user. The LED module 416 may include one or more LEDs 112, 116. In one embodiment, the authentication to be displayed by the LED module 416 includes lighting the LEDs 112, 116 in a predetermined sequence. The LED module 416 may include software connections and drivers to control the LEDs 112 of a device 102 selected for authentication. In an alternative embodiment, the LED module 416 of a stand-alone removable authenticator 114 may include one or more LEDs 116.

In various embodiments, the communication module 306 may include one or more of the modules 412, 414, 416 described above. In one embodiment, the authentication signal may incorporate audio, video, and LED elements in the event that the removable authenticator 114, or the device 102 selected for authentication only include components for one of the audio module 412, the video module 414, or the LED module 416.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
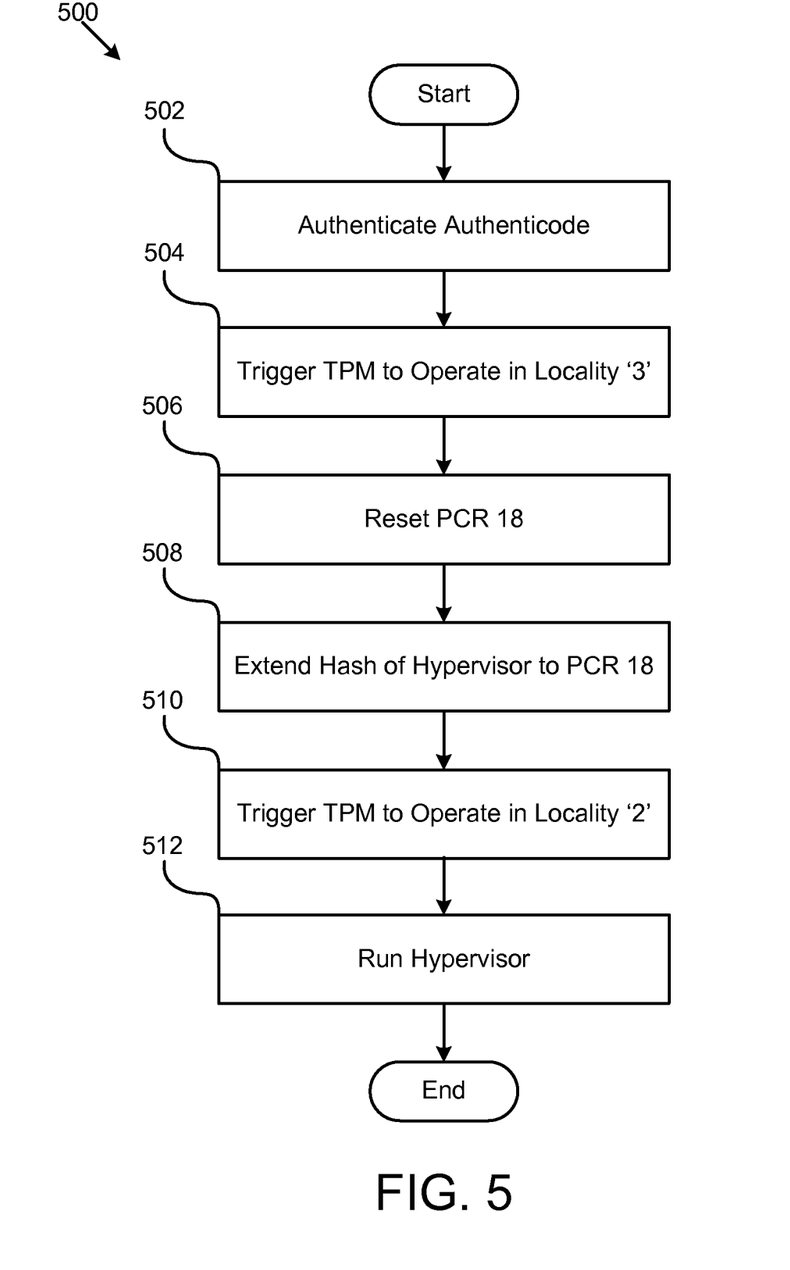
FIG. 5 is a schematic flow chart diagram illustrating one embodiment of root of trust measurement of a hypervisor program.

FIG. 5 is a schematic flow chart diagram illustrating one embodiment of root of trust measurement 500 of a hypervisor program 112. In one embodiment, the measurement 500 starts when the TPM 204 authenticates 502 an authenticode configured to load and execute the hypervisor code 214. The CPU 202 may then trigger 504 the TPM 204 to operate in locality '3.' The CPU 202 may additionally reset 506 the PCR 206. In one particular embodiment, the hypervisor measurement is extended to PCR number 18, so PCR number 18 is reset 506. The TPM 204 may then extend 508 a hash value corresponding to the hypervisor code 214 into PCR number 18. The CPU 202 may then trigger 510 the TPM to operate in locality '2' and run 514 the hypervisor code 214, and the measurement ends.

Figure 6:
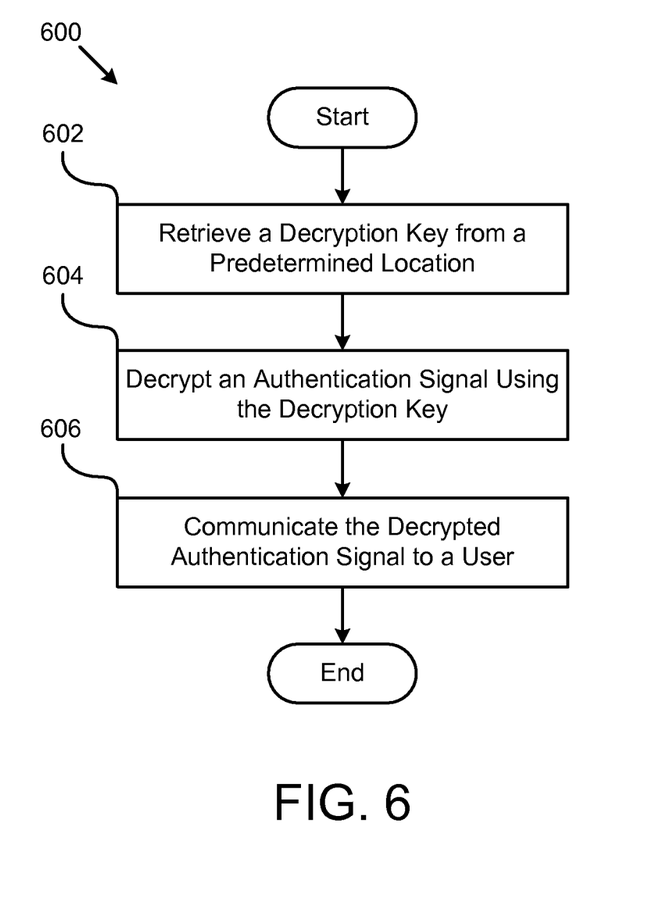
FIG. 6 is a schematic flow chart diagram illustrating one embodiment of a method for authentication of a CRTM chain.

FIG. 6 is a schematic flow chart diagram illustrating one embodiment of a method 600 for authentication of a CRTM chain. In one embodiment, the method 600 starts when the retrieval module 302 retrieves 602 a decryption key from a predetermined location on the device 102 selected for authentication. The decryption module 304 may then decrypt 604 an authentication signal using the decryption key. The communication module 306 may communicate 606 the decrypted authentication signal to a user and the method 600 ends.

For example, the retrieval module 302 may retrieve 602 a hash value corresponding to the hypervisor code 214 from the PCR 206 on the TPM 204. The decryption module 304 may then decrypt 604 a ring tone using the hash value as the decryption key. The communication module 306 may then communicate 606 the ring tone to a user via the speakers 110 on the device 102 selected for authentication.

Figure 7:
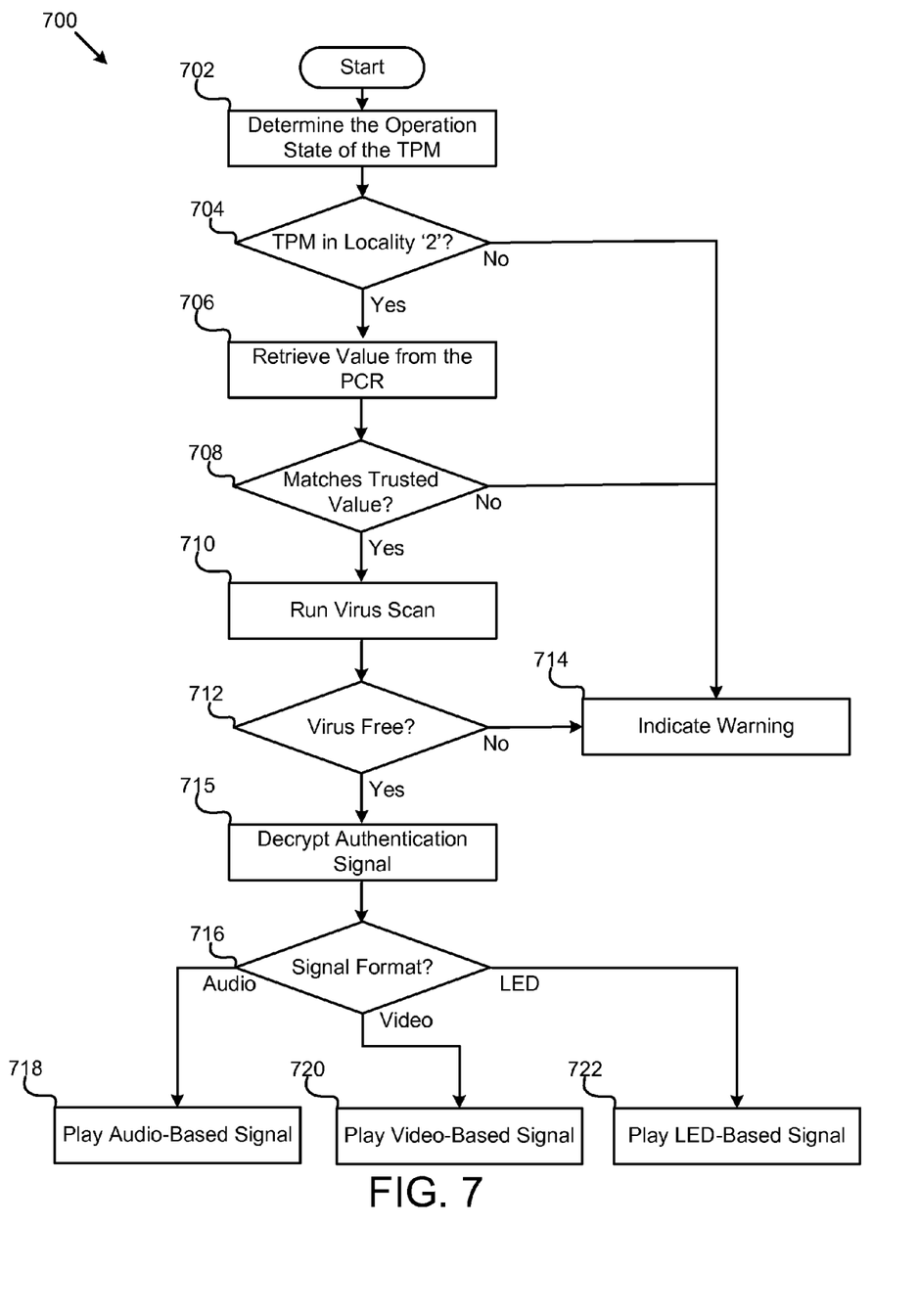
FIG. 7 is a detailed schematic flow chart diagram illustrating one embodiment of a method for authentication of a CRTM chain.

FIG. 7 is a detailed schematic flow chart diagram illustrating one embodiment of a method 700 for authentication of a CRTM chain. In one embodiment, the method starts when the TPM interface 402 determines 702 the locality of the TPM 204. If it is determined 704 that the TPM 402 is operating in locality two (2), the PCR interface 404 may retrieve 706 the hash value from the PCR 206 which may be used to unlock the decryption key by the decryption module. In one embodiment, the value was previously stored in PCR number 18 as described above with reference to FIG. 5.

If the comparison module 406 determines 708 that the value obtained by the PCR interface 404 matches the trusted value 408, the virus scan module 410 may run 710 a virus scan on the device 102 selected for authentication. If the virus scan module 412 determines 710 that the device 102 is virus free, the decryption module may unlock the decryption key from the cryptographic blob, and decrypt 715 the authentication module. The communication module 306 may determine 716 which type of authentication signal was decrypted by the decryption module 304. If it is determined 716 that the authentication signal is audio-based, the audio module 412 may play 718 the audio-based authentication signal to a user. If it is determined 716 that the authentication signal is video-based, the video module 414 may display 720 the authentication signal. In another embodiment, if it is determined 716 that the authentication signal is LED-based, the LED module 416 may display 722 the authentication signal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a retrieval module configured to retrieve a measurement value from a predetermined location on a device selected for authentication for unlocking a decryption key, a correct measurement value enabling unlocking of the decryption key;
   a decryption module in communication with the retrieval module, the decryption module configured to decrypt an external authentication signal using the unlocked decryption key prior to executing a local boot block of the device, the authentication signal stored external to the device, the authentication signal comprising a message that once decrypted and presented to a user is recognizable by the user; and
   a communication module in communication with the decryption module, the communication module configured to communicate the decrypted authentication signal to a user as one or more of a visual and audible signal discernible by the user to determine that the authentication signal was correctly decrypted.

2. The apparatus of claim 1, wherein the retrieval module further comprises a Trusted Platform Module (TPM) interface configured to determine an operation state of a TPM, and wherein the decryption module decrypts the authentication signal in response to a determination that the TPM is operating in a predetermined operation state.

3. The apparatus of claim 1, wherein the retrieval module further comprises a Platform Configuration Register (PCR) interface configured to obtain a value from a PCR, wherein the value was previously extended to the PCR by a computer program selected for authentication, and wherein the value unlocks the decryption key.

4. The apparatus of claim 1, wherein the decryption module further comprises a virus scan module configured to perform a virus scan on the selected device, and wherein the decryption module decrypts the authentication signal in response to a determination that the device selected for authentication is virus free.

5. The apparatus of claim 1, wherein the communication module further comprises at least one of:
   an audio module configured to play an audio-based authentication signal to a user;
   a video module configured to display a video-based authentication signal to a user; and
   a Light Emitting Diode (LED) module configured to display an LED-based authentication signal to a user.

6. The apparatus of claim 3, wherein the computer program selected for authentication is a virtualization program.

7. The apparatus of claim 3, wherein the decryption module further comprises a comparison module configured to compare the value obtained by the PCR interface with a trusted value stored separately from the device selected for authentication, and wherein the decryption module decrypts the authentication signal in response to a determination that the value obtained by the PCR interface and the trusted key value.

8. A system comprising:
   a device selected for authentication, the device comprising:
      a Trusted Platform Module (TPM) configured to facilitate CRTM; and
      a Platform Configuration Register (PCR) coupled to the TPM, and configured to store CRTM values; and
   a removable authenticator, configured to:
      retrieve a measurement value from a predetermined location on a device selected for authentication for unlocking a decryption key, a correct measurement value enabling unlocking of the decryption key;
      decrypt an external authentication signal using the unlocked decryption key prior to executing a local boot block of the device, the authentication signal stored external to the device, the authentication signal comprising a message that once decrypted and presented to a user is recognizable by the user; and
      communicate the decrypted authentication signal to a user as one or more of a visual and audible signal discernible by the user to determine that the authentication signal was correctly decrypted.

9. The system of claim 8, wherein the removable authenticator is further configured to:
   determine an operation state of the TPM; and
   decrypt the authentication signal in response to a determination that the TPM is operating in a predetermined operation state.

10. The system of claim 8, wherein the removable authenticator is further configured to obtain a value from the PCR, wherein the value was previously extended to the PCR by a computer program selected for authentication, and wherein the value unlocks the decryption key.

11. The system of claim 8, wherein the removable authenticator is further configured to:
    trigger a virus scan on the selected device; and
    decrypt the authentication signal in response to a determination that the device selected for authentication is virus free.

12. The system of claim 8, wherein the removable authenticator further comprises at least one of:
    an audio controller configured to play an audio-based authentication signal to a user;
    a video controller configured to display a video-based authentication signal to a user; and
    a Light Emitting Diode (LED) controller configured to display an LED-based authentication signal to a user.

13. The system of claim 10, wherein the computer program selected for authentication is a virtualization program.

14. The system of claim 10, wherein the removable authenticator is further configured to:
    compare the value obtained by the PCR interface with a trusted value stored separately from the device selected for authentication; and
    decrypt the authentication signal in response to a determination that the value obtained by the PCR interface and the trusted value match.

15. A method comprising:
    retrieving a measurement value from a predetermined location on a device selected for authentication for unlocking a decryption key, a correct measurement value enabling unlocking of the decryption key;
    decrypting an external authentication signal using the unlocked decryption key prior to executing a local boot block of the device, the authentication signal stored external to the device, the authentication signal comprising a message that once decrypted and presented to a user is recognizable by the user; and
    communicating the decrypted authentication signal to a user as one or more of a visual and audible signal discernible by the user to determine that the authentication signal was correctly decrypted.

16. The method of claim 15, wherein the method further comprises:
    determining an operation state of a TPM; and decrypting the authentication signal in response to a determination that the TPM is operating in a predetermined operation state.

17. The method of claim 15, wherein the method further comprises obtaining a value from a PCR, wherein the value was previously extended to the PCR by a computer program selected for authentication, and wherein the value unlocks the decryption key.

18. The method of claim 15, wherein the method further comprises:
   triggering a virus scan on the selected device; and
   decrypting the authentication signal in response to a determination that the device selected for authentication is virus free.

19. The method of claim 15, wherein the method further comprises at least one of:
   playing an audio-based authentication signal to a user;
   displaying a video-based authentication signal to a user; and
   displaying a Light Emitting Diode (LED) based authentication signal to a user.

20. The method of claim 17, wherein the method further comprises:
   comparing the value obtained by the PCR interface with a trusted value stored separately from the device selected for authentication; and
   decrypting the authentication signal in response to a determination that the value obtained by the PCR interface and the trusted value match.

* * * * *